(12) United States Patent
McAllister

(10) Patent No.: US 11,812,698 B1
(45) Date of Patent: Nov. 14, 2023

(54) BALE ACCUMULATOR

(71) Applicant: Bill McAllister, Moulton, IA (US)

(72) Inventor: Bill McAllister, Moulton, IA (US)

( * ) Notice: Subject to any disclaimer, the term of this patent is extended or adjusted under 35 U.S.C. 154(b) by 0 days.

(21) Appl. No.: 17/830,096

(22) Filed: Jun. 1, 2022

(51) Int. Cl.
*A01D 85/00* (2006.01)

(52) U.S. Cl.
CPC ...... *A01D 85/005* (2013.01); *A01D 2085/007* (2013.01); *A01D 2085/008* (2013.01)

(58) Field of Classification Search
CPC ............... A01D 90/08; A01D 85/005; A01D 2085/007; A01D 87/12; A01D 2085/008
USPC ........ 414/24.5, 24.6, 111, 789.7, 789.4, 502; 56/473.5
See application file for complete search history.

(56) References Cited

U.S. PATENT DOCUMENTS

| | | | | |
|---|---|---|---|---|
| 3,170,584 A | * | 2/1965 | Crawford | A01D 85/005 414/473 |
| 3,481,497 A | * | 12/1969 | Butler | A01D 90/08 414/469 |
| 3,647,091 A | * | 3/1972 | Walters | A01D 90/08 414/789.7 |
| 4,955,774 A | * | 9/1990 | Van Eecke | A01D 90/08 414/502 |
| 2002/0187021 A1 | * | 12/2002 | Drost | B60P 1/43 414/469 |
| 2017/0172070 A1 | * | 6/2017 | Conley | A01D 90/08 |

\* cited by examiner

*Primary Examiner* — Gregory W Adams
(74) *Attorney, Agent, or Firm* — ZarleyConley PLC

(57) ABSTRACT

The disclosure provided herein is directed to a bale accumulator that receives a bale and then using an intake conveyor transports the bale onto the bale accumulator. A push ram removes the bale from the intake conveyor and onto a flip tray that flips the bale onto an edge of the bale and onto a trough ram. The trough ram pushes the bale onto a trough that when filled with bales by the trough ram actuates a fence ram. The fence ram moves the bales onto a bed. When the bed is filled or at the selection of an operator, an unloading assembly moves the bales off the bed and onto a ground surface, which is facilitated by the bed having a dovetail assembly that lowers the bed to the ground surface. An adjustable fence allows modification to the number of bales that can fit onto the bed.

23 Claims, 14 Drawing Sheets

BALE ACCUMULATOR

BACKGROUND OF THE INVENTION

This disclosure generally relates to a bale accumulator. More specifically, the disclosure relates to a bale accumulator pulled by a vehicle, such as a tractor.

Bale accumulators are known in the art. However, current bale accumulators suffer from one or more deficiencies.

For one, some known bale accumulators have a fully automated unloading process. As a result, the bed of the bale accumulator unloads the bales as soon as the bed is filled leading to instances where bales are unloaded while the bale accumulator is being pulled through a curve or a ditch. This in turn causes the bales to be unloaded in a non-uniform arrangement that requires rearrangement by other means before the bales can be collected from the field.

Similarly, the automatic unloading of such bale accumulators can result in instances where the bales are unloaded in a location that will result in the bales obstructing further bale accumulation. For instance, when the outer edge of a field is collected the bales are automatically unloaded in the way of a row that has yet to be accumulated. This requires the bales to be moved from the position the bales are unloaded to a position that will not interfere, thereby leading to downtime in the accumulation of additional bales and/or the need for additional operators in the field.

Another deficiency present in the art relates to accumulation of the bales after the bed is filled. Current designs do not permit additional bales to be stored resulting in the bed needing to be unloaded more frequently and, in some cases, requiring additional time and effort to accumulate remaining bales when the bed has already been filled.

Yet another deficiency pertains to bale accumulators that utilize an angled bed where bales are transported at an angle upwardly and outwardly from the baler and then slide down onto the bed upon reaching a peak. While useful, these configurations have a center of gravity that can be problematic in certain terrains. Additionally, the number of bales is limited as the height of such bale accumulators is necessarily limited to not become unwieldy. In general, the capacity of known bale accumulators is limited and is not expanded or otherwise adjustable in both loading and unloading configurations.

Thus it is a primary aspect of this disclosure to provide a bale accumulator that improves upon the art.

Another aspect of this disclosure is to provide a bale accumulator that provides for unloading at a desired location.

Yet another aspect of this disclosure is to provide a bale accumulator that provides uniformed unloading of the bales.

Another aspect of this disclosure is to provide a bale accumulator that is adjustable in operation and storage.

Yet another aspect of this disclosure is to provide a bale accumulator that allows accumulation after the bed is filled.

Another aspect of this disclosure is to provide a bale accumulator that operates in a substantially parallel relationship to a ground surface.

Yet another aspect of this disclosure is to provide a bale accumulator that provides on-demand unloading.

These and other aspects, features, and advantages of the invention will become apparent from the specification and claims.

SUMMARY OF THE INVENTION

The disclosure provides various aspects of a bale accumulator.

In some aspects, the techniques broadly described herein relate to a bale accumulator including: a frame having a front, a rear, a first side and a second side; an intake conveyor extending outwardly from the front side of the frame; a push ram connected to the frame; a trough ram connected to the frame; a trough connected to the frame; and a fence ram connected to the frame; wherein the push ram is configured to move a bale from the intake conveyor towards the second side of the frame; wherein the trough ram is configured to move the bale from the front of the frame onto the trough; wherein the trough ram is configured to move the bale towards the first side onto the bed.

In some aspects, the techniques broadly described herein relate to a bale accumulator further including a flip tray connected to the frame; wherein the flip tray is configured to flip the bale on an edge of the bale.

In some aspects, the techniques broadly described herein relate to a bale accumulator further including an adjustable fence connected to the frame; wherein the flip tray is adjustably connected to the frame such that the adjustable fence has a first position along the second side of the frame and a second position inset from the second side of the frame and over the bed.

In some aspects, the techniques broadly described herein relate to a bale accumulator further including a stabilizer frame connected to and above the frame.

In some aspects, the techniques broadly described herein relate to a bale accumulator further including a trough gate rotatably connected to the stabilizer frame and positioned over the trough.

In some aspects, the techniques broadly described herein relate to a bale accumulator further including a stabilizer rotatably connected to the stabilizer frame, wherein the stabilizer is configured to stabilize the bale during transport and rotate when the bale is unloaded.

In some aspects, the techniques broadly described herein relate to a bale accumulator further including a storage surface connected to the frame and positioned between the intake conveyor and the trough ram.

In some aspects, the techniques broadly described herein relate to a bale accumulator further including a pair of dolly wheels connected to the front of the frame.

In some aspects, the techniques broadly described herein relate to a bale accumulator further including a load indicator configured to actuate when the bed is full.

In some aspects, the techniques broadly described herein relate to a bale accumulator further including an unloading assembly connected to the frame; wherein the unloading assembly is configured to move the bale off the bed and onto a ground surface to the rear of the frame.

In some aspects, the techniques broadly described herein relate to a bale accumulator further including the unloading assembly including an apron extending around the bed between the front and the rear of the frame, and a guide extending between the first side and the second side of the frame and over the bed.

In some aspects, the techniques broadly described herein relate to a bale accumulator further including a dovetail assembly connected to the frame; wherein the dovetail assembly is configured to lower at least a portion of the bed at an angle downwardly to a ground surface.

In some aspects, the techniques broadly described herein relate to a bale accumulator further including a linkage connected to the frame and extending through a slot in the trough and connected to a fence face of the fence ram; wherein the linkage is configured to travel along a path of the slot.

In some aspects, the techniques broadly described herein relate to a bale accumulator further including the linkage including a cylindrical member, an arm connecting member, and a face connecting member; wherein the cylindrical member is rotatably connected to the frame, and the arm connecting member and the face connecting member are fixedly connected to the cylindrical member.

In some aspects, the techniques broadly described herein relate to a bale accumulator further including an unloading assembly and a dovetail assembly connected to the frame; wherein the unloading assembly and the dovetail are selectively actuated by an operator via a controller.

In some aspects, the techniques broadly described herein relate to a bale accumulator further including a push ram trip connected to the frame; wherein the push ram trip is configured to actuate by contact with the bale upon the bale reaching an unloading end of the intake conveyor; and wherein when the push ram trip is actuated, the push ram is actuated.

In some aspects, the techniques broadly described herein relate to a bale accumulator further including a flip tray and a flip tray trip connected to the frame; wherein the flip tray trip is configured to actuate by contact with the bale upon the bale being received over the flip tray; and wherein when the flip tray trip is actuated, the flip tray flips the bale onto an edge of the bale.

In some aspects, the techniques broadly described herein relate to a bale accumulator further including a load indicator assembly connected to the frame; wherein the load indicator assembly is configured to actuate a load indicator when the bed is filled with a plurality of bales.

In some aspects, the techniques broadly described herein relate to a bale accumulator further including a dovetail indicator assembly connected to the frame; wherein the dovetail indicator assembly is configured to actuate when a dovetail of an unloading assembly connected to the frame is in a lowered position.

In some aspects, the techniques broadly described herein relate to a bale accumulator wherein the frame, the intake conveyor, the push ram, the trough ram, the trough, the fence ram, and the bed are configured to extend in substantially parallel spaced alignment with a ground surface during operation of the bale accumulator.

This has outlined, rather broadly, the features, advantages, solutions, and benefits of the disclosure in order that the description that follows may be better understood. Additional features, advantages, solutions, and benefits of the disclosure will be described in the following. It should be appreciated by those skilled in the art that this disclosure may be readily utilized as a basis for modifying or designing other structures and related operations for carrying out the same purposes of the present disclosure. It should also be realized by those skilled in the art that such equivalent constructions and related operation do not depart from the teachings of the disclosure as set forth in the appended claims. The novel features, together with further objects and advantages, will be better understood from the following description when considered in connection with the accompanying Figures. It is to be expressly understood, however, that each of the Figures is provided for the purpose of illustration and description only and is not intended as a definition of the limits of the present disclosure.

DETAILED DESCRIPTION

Figure 1:
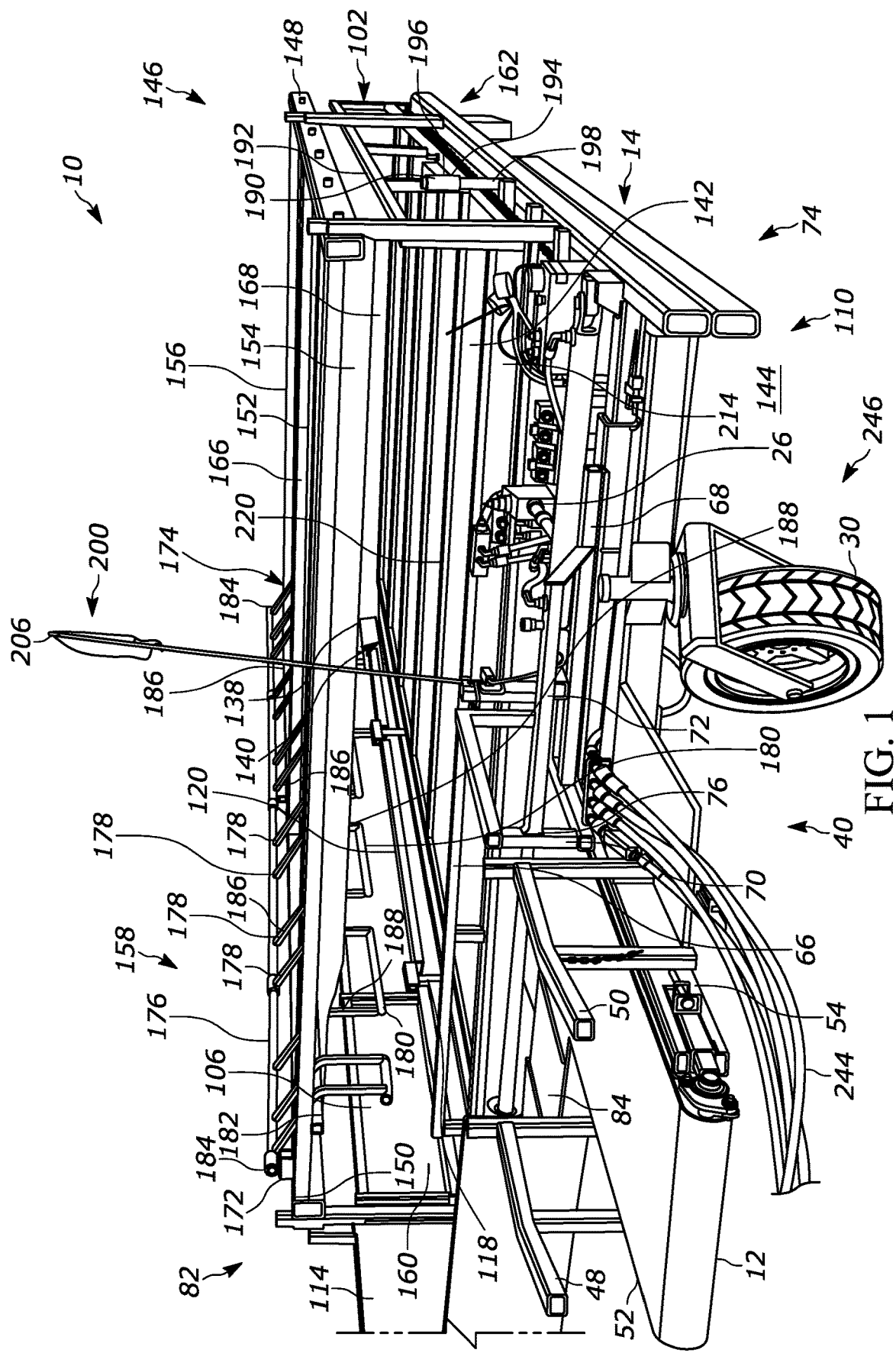
FIG. 1 is a perspective view of a bale accumulator according to an aspect of the disclosure.
Figure 2:
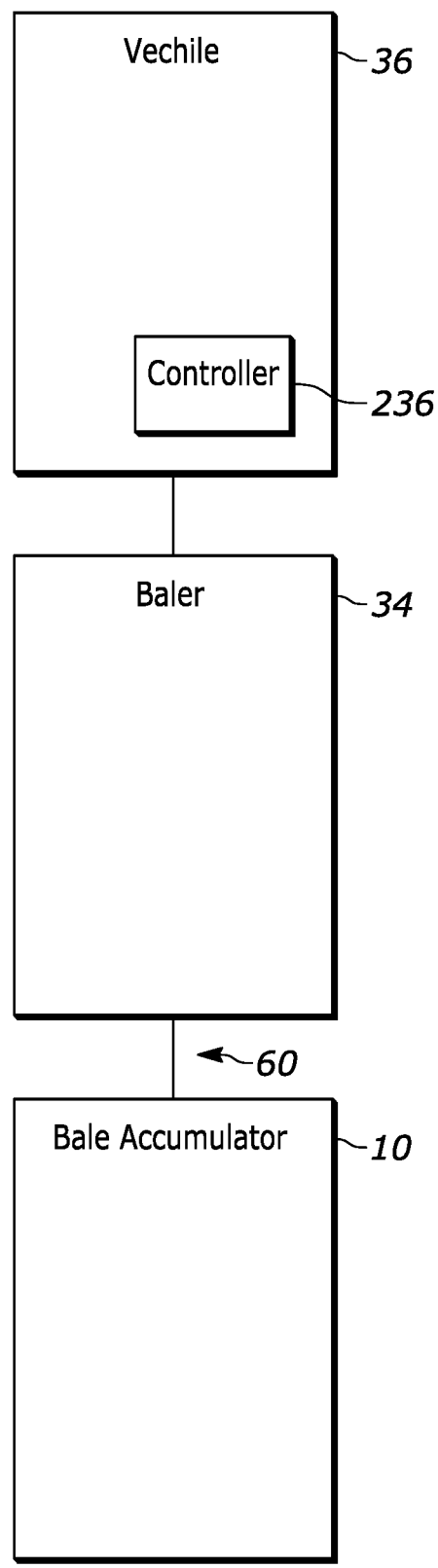
FIG. 2 is a diagram view of a bale accumulator according to an aspect of the disclosure.
Figure 3:
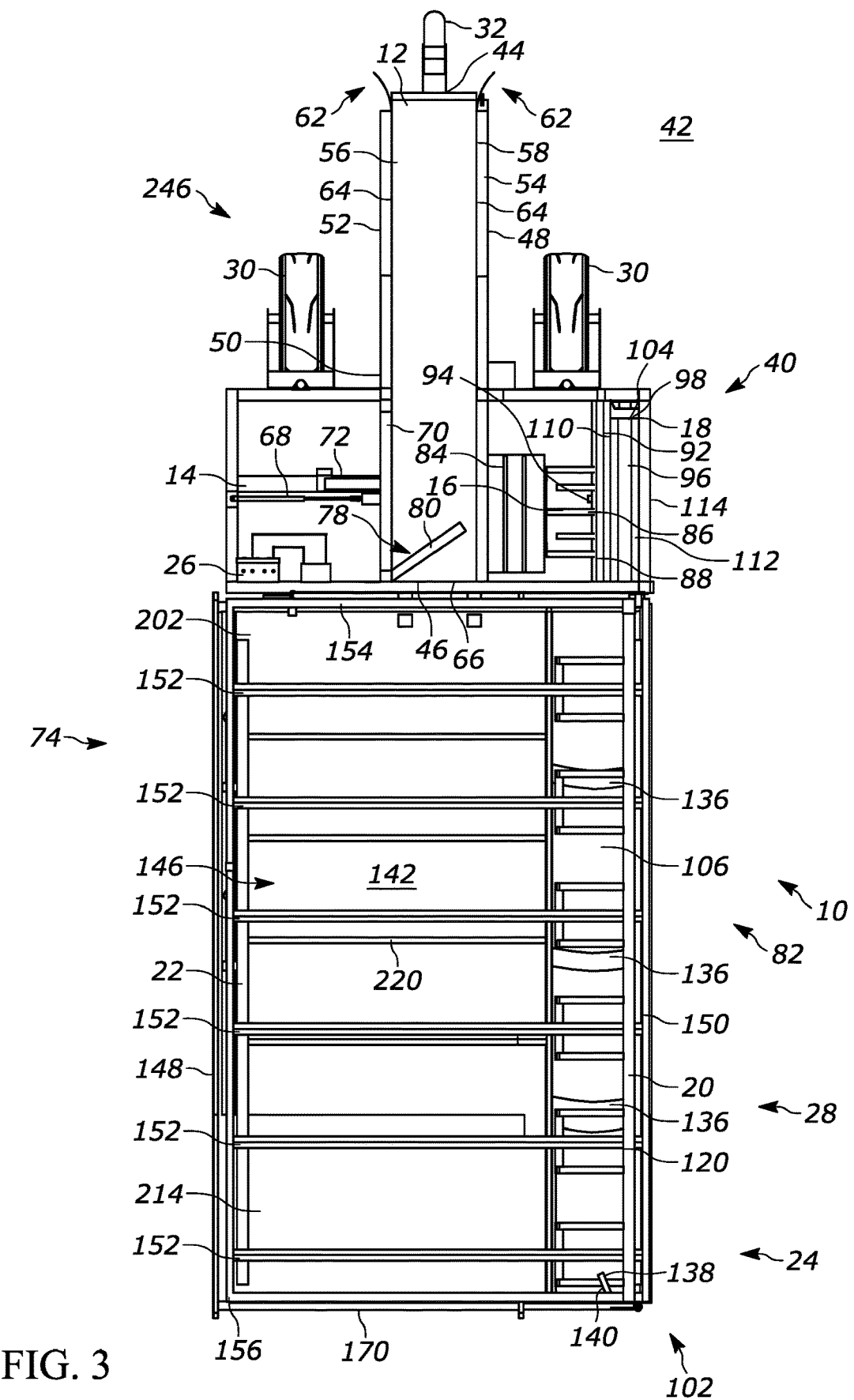
FIG. 3 is a top view of a bale accumulator according to an aspect of the disclosure.
Figure 4:
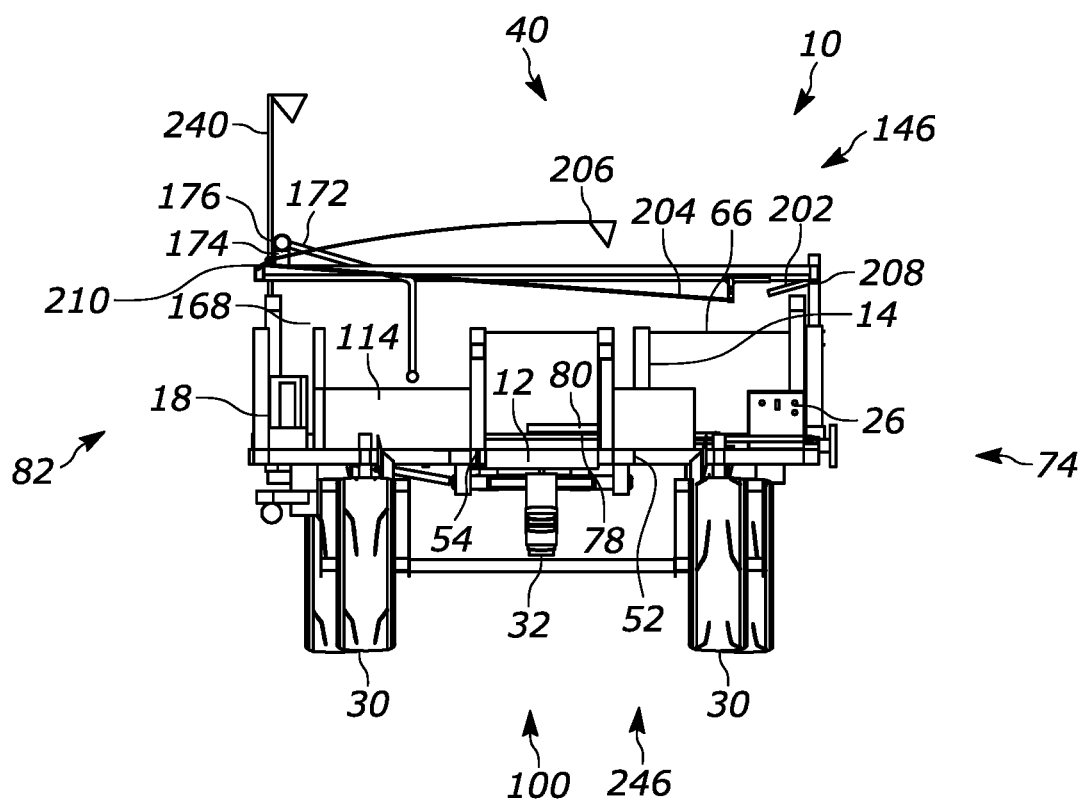
FIG. 4 is a front view of a bale accumulator according to an aspect of the disclosure.
Figure 5:
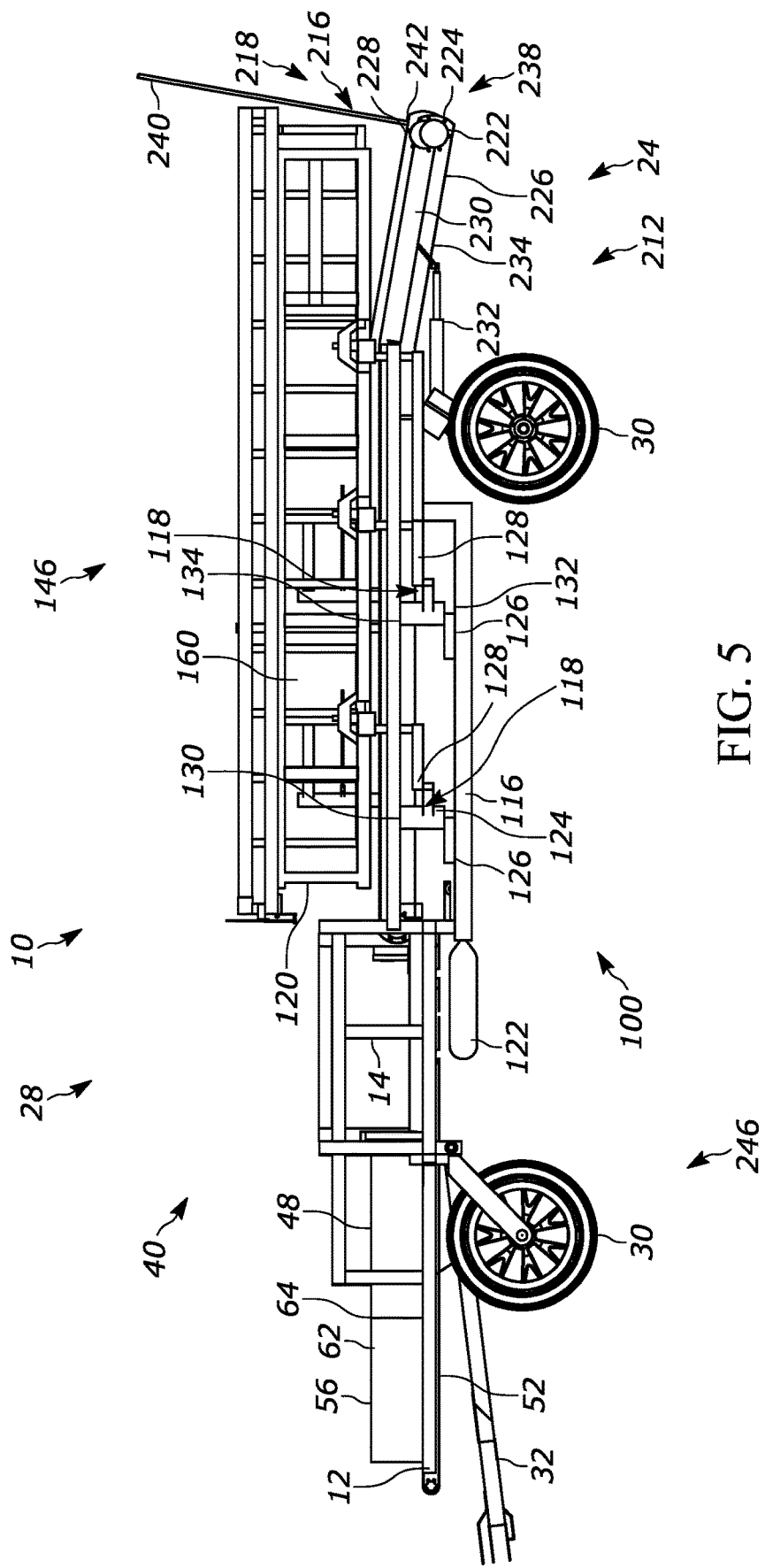
FIG. 5 is a side view of a bale accumulator according to an aspect of the disclosure.
Figure 6:
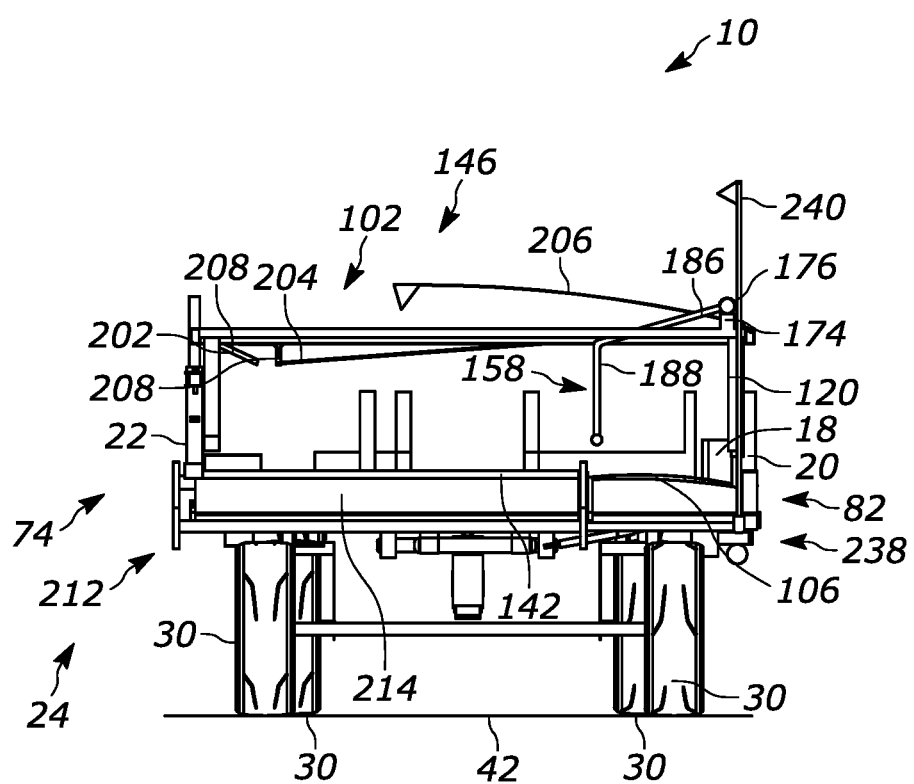
FIG. 6 is a rear view of a bale accumulator according to an aspect of the disclosure.
Figure 7:
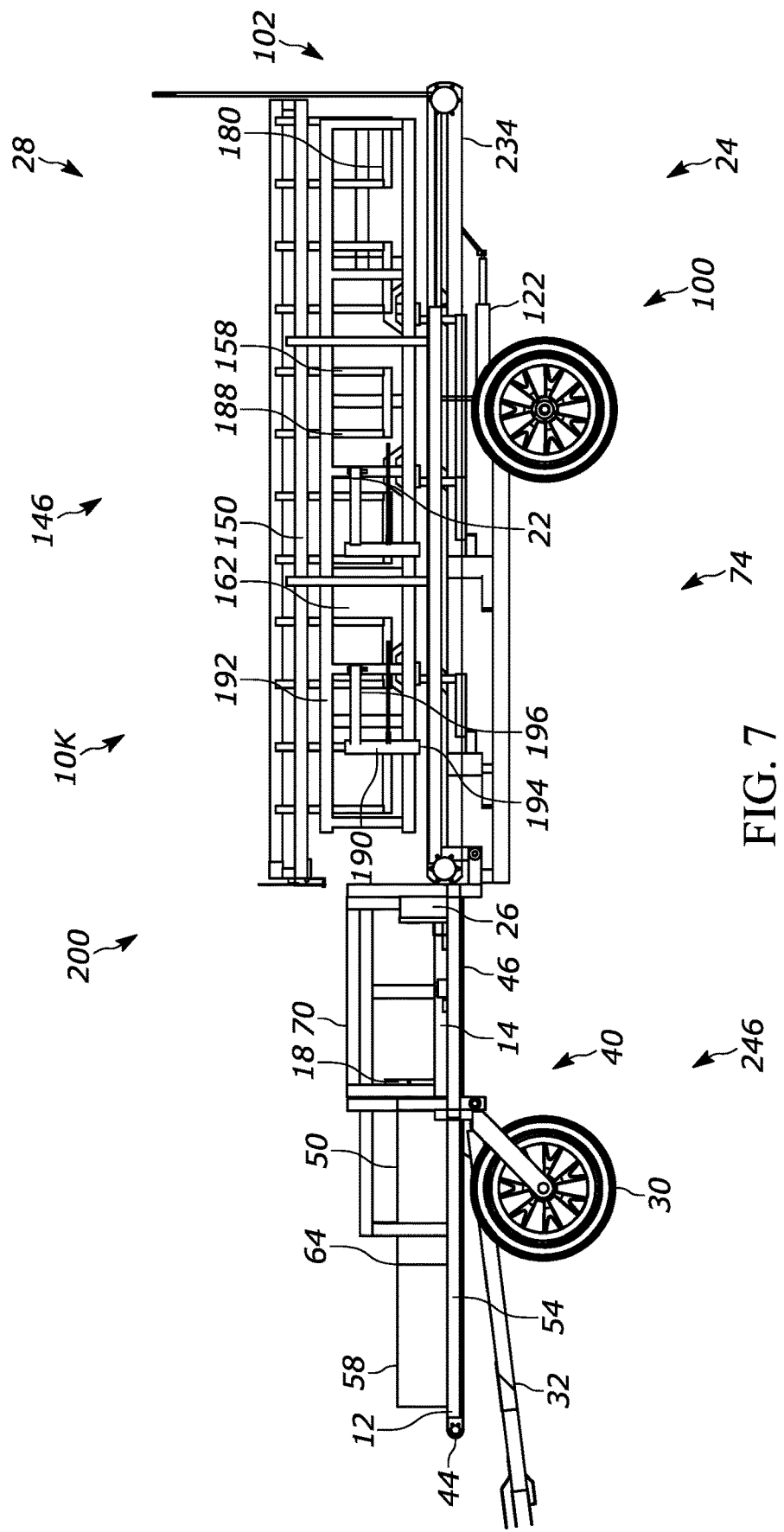
FIG. 7 is a side view of a bale accumulator according to an aspect of the disclosure.
Figure 8:
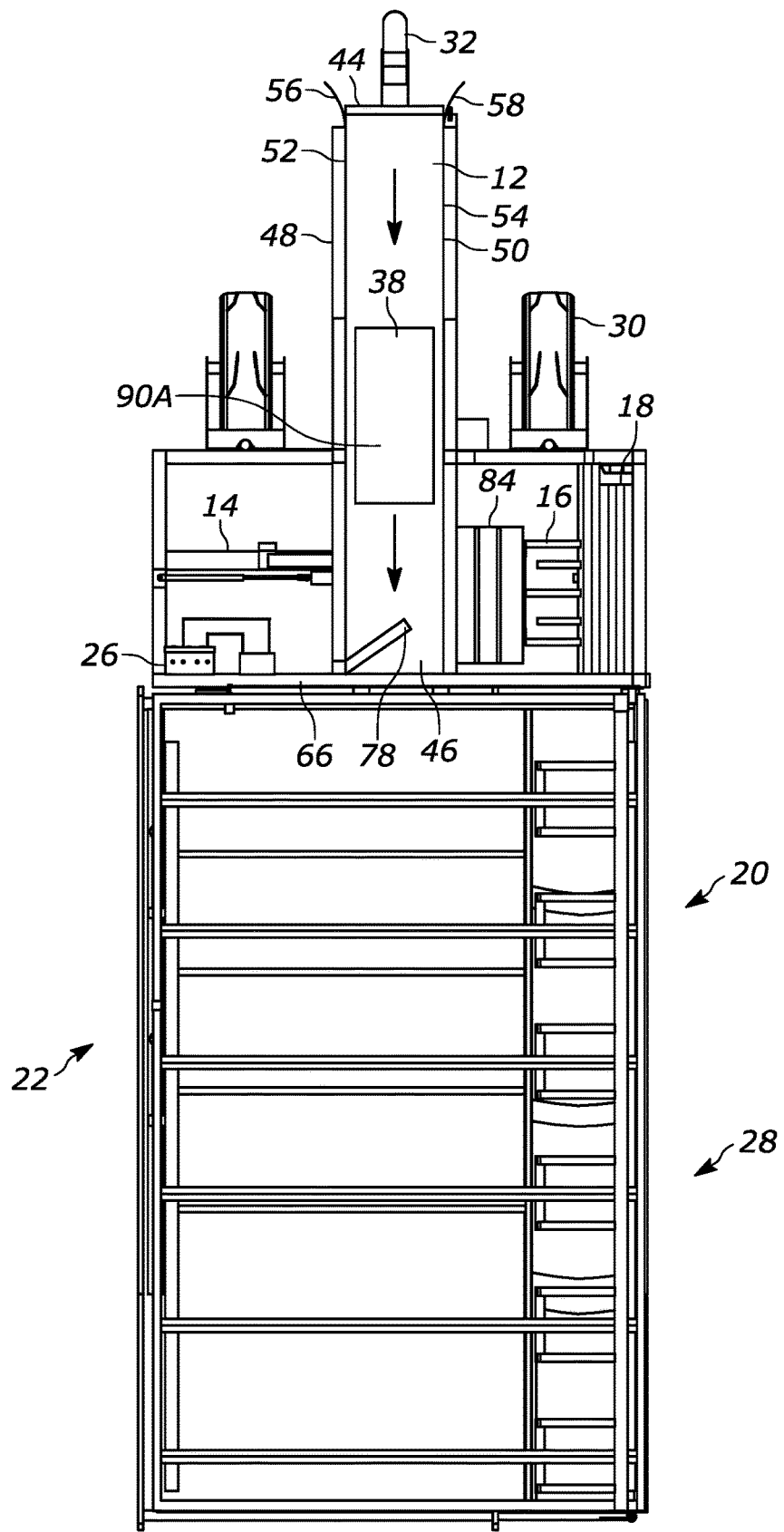
FIG. 8 is a top view of a bale accumulator according to an aspect of the disclosure, including an exemplary depiction of the movement of a bale by an intake conveyor.
Figure 9:
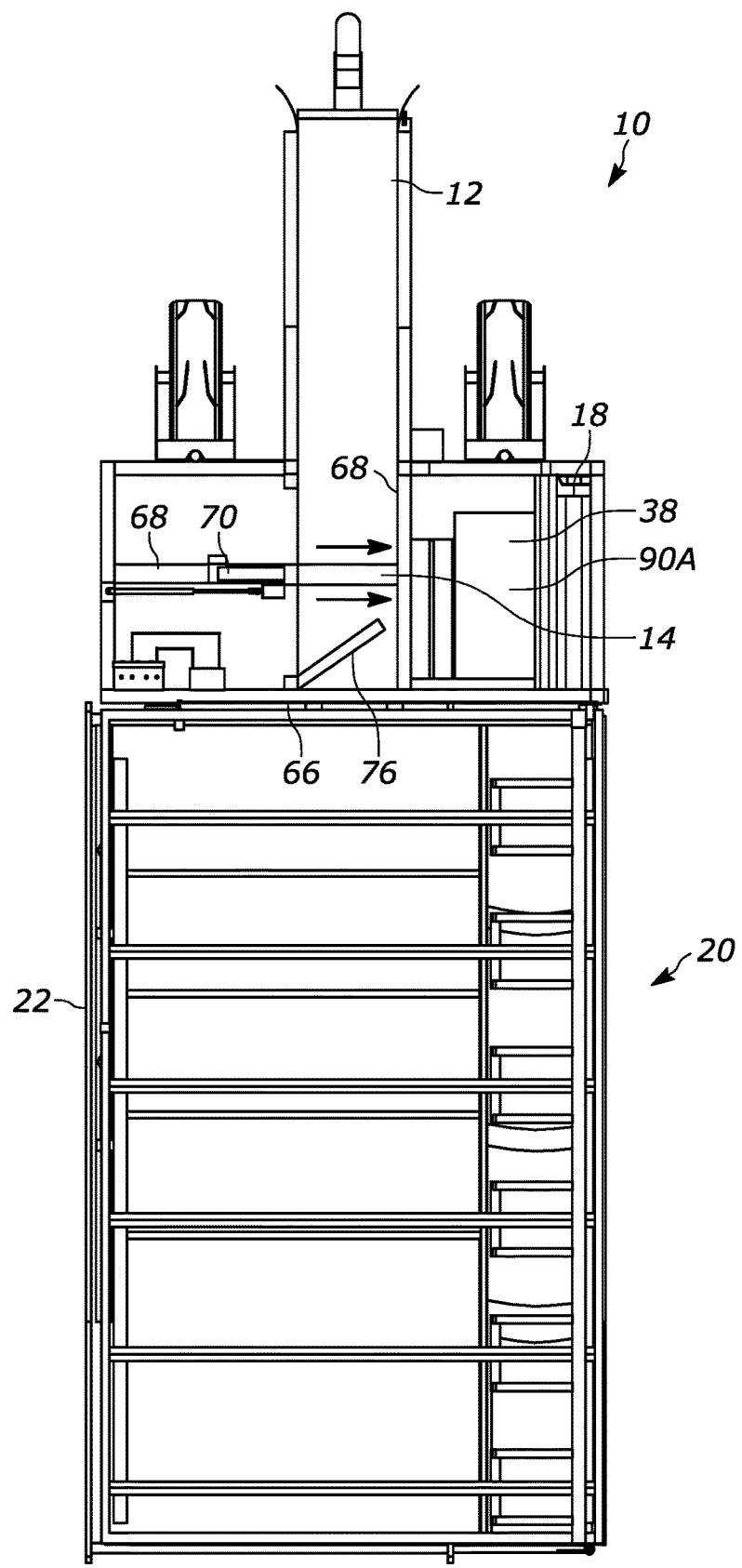
FIG. 9 is a top view of a bale accumulator according to an aspect of the disclosure, including an exemplary depiction of the movement of a bale on by a push ram.
Figure 10:
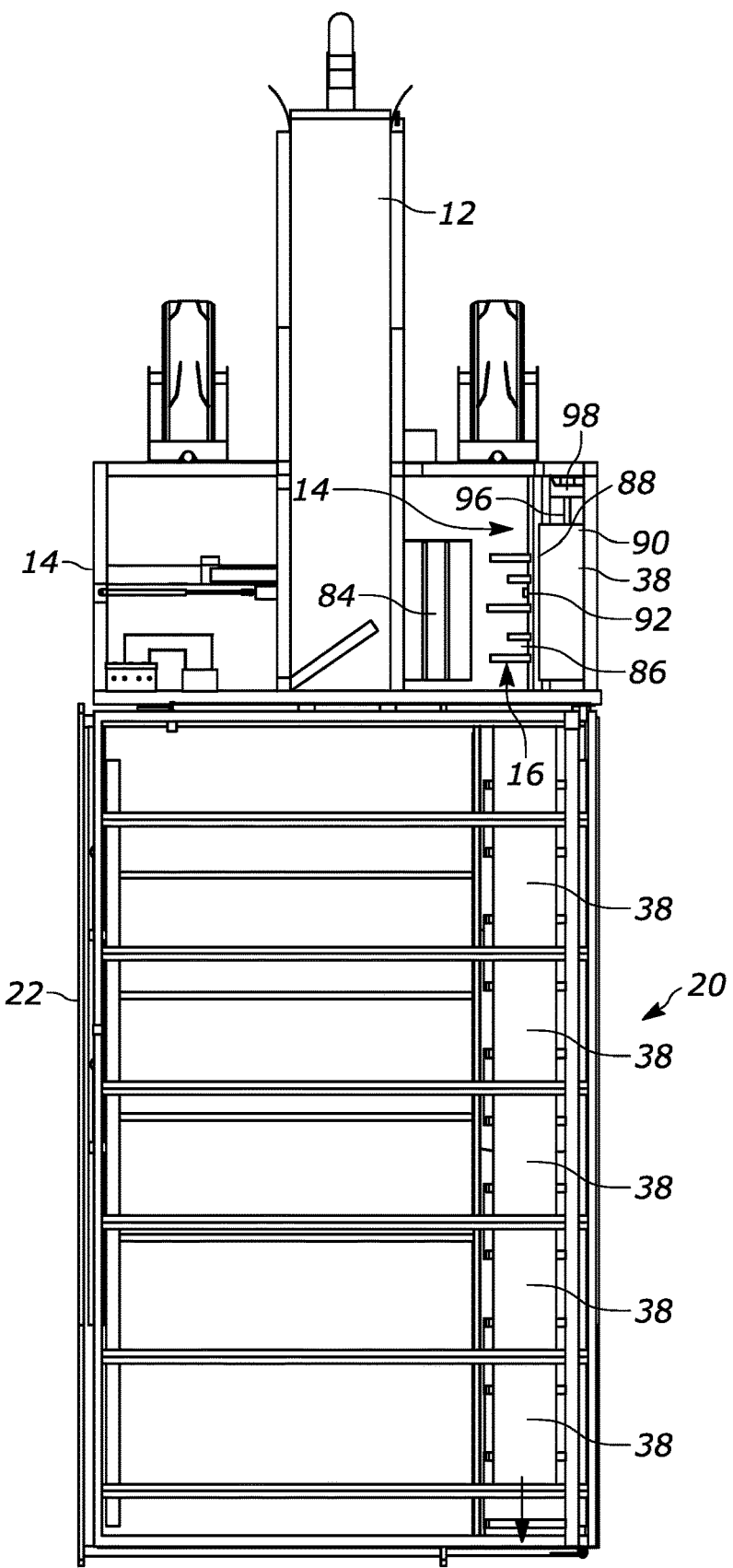
FIG. 10 is a top view of a bale accumulator according to an aspect of the disclosure, including an exemplary depiction of the movement of a bale by a flip tray.
Figure 11:
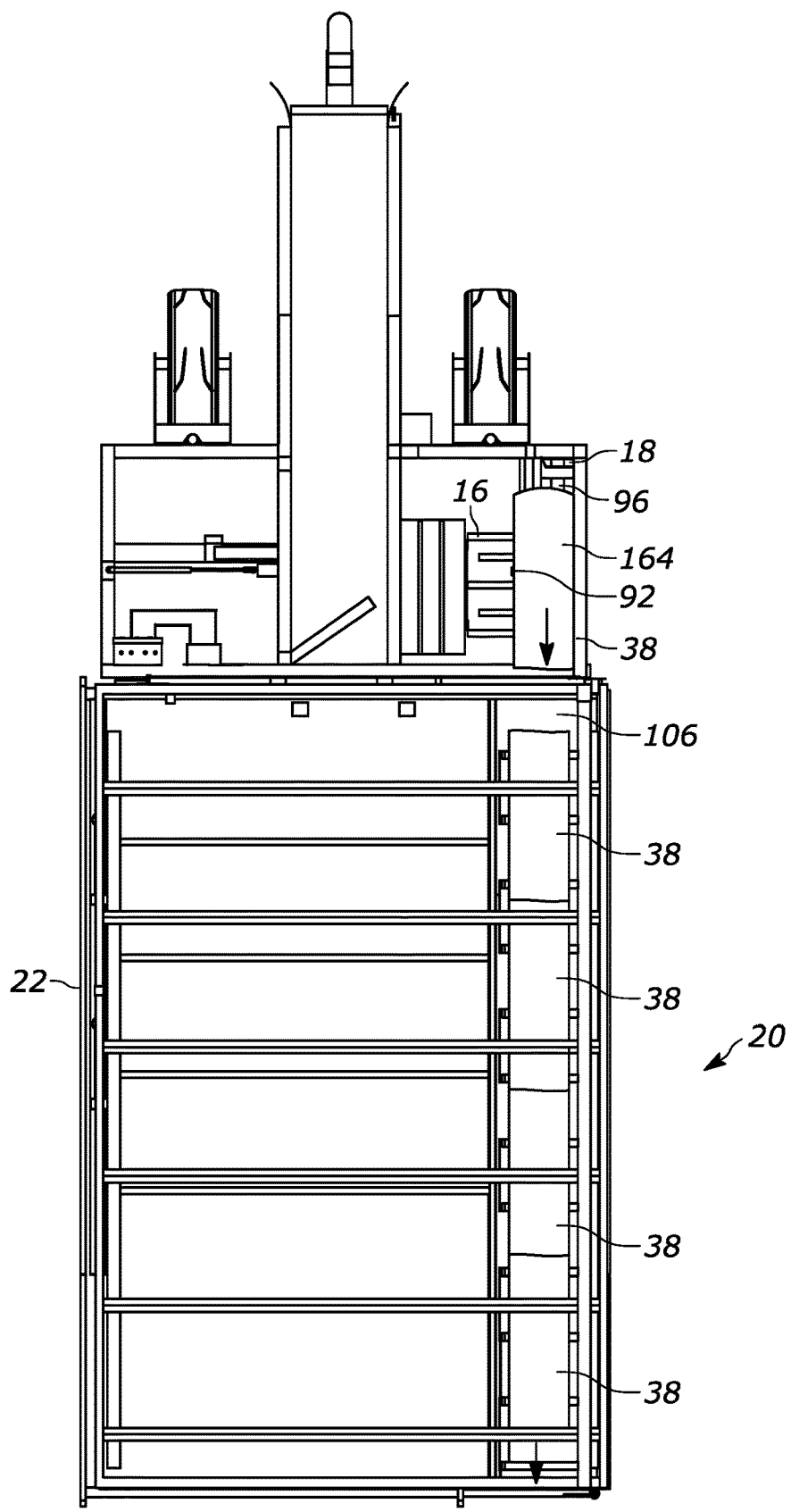
FIG. 11 is a top view of a bale accumulator according to an aspect of the disclosure, including an exemplary depiction of the movement of a bale on by a trough ram thereby forming a column of the bales.
Figure 12:
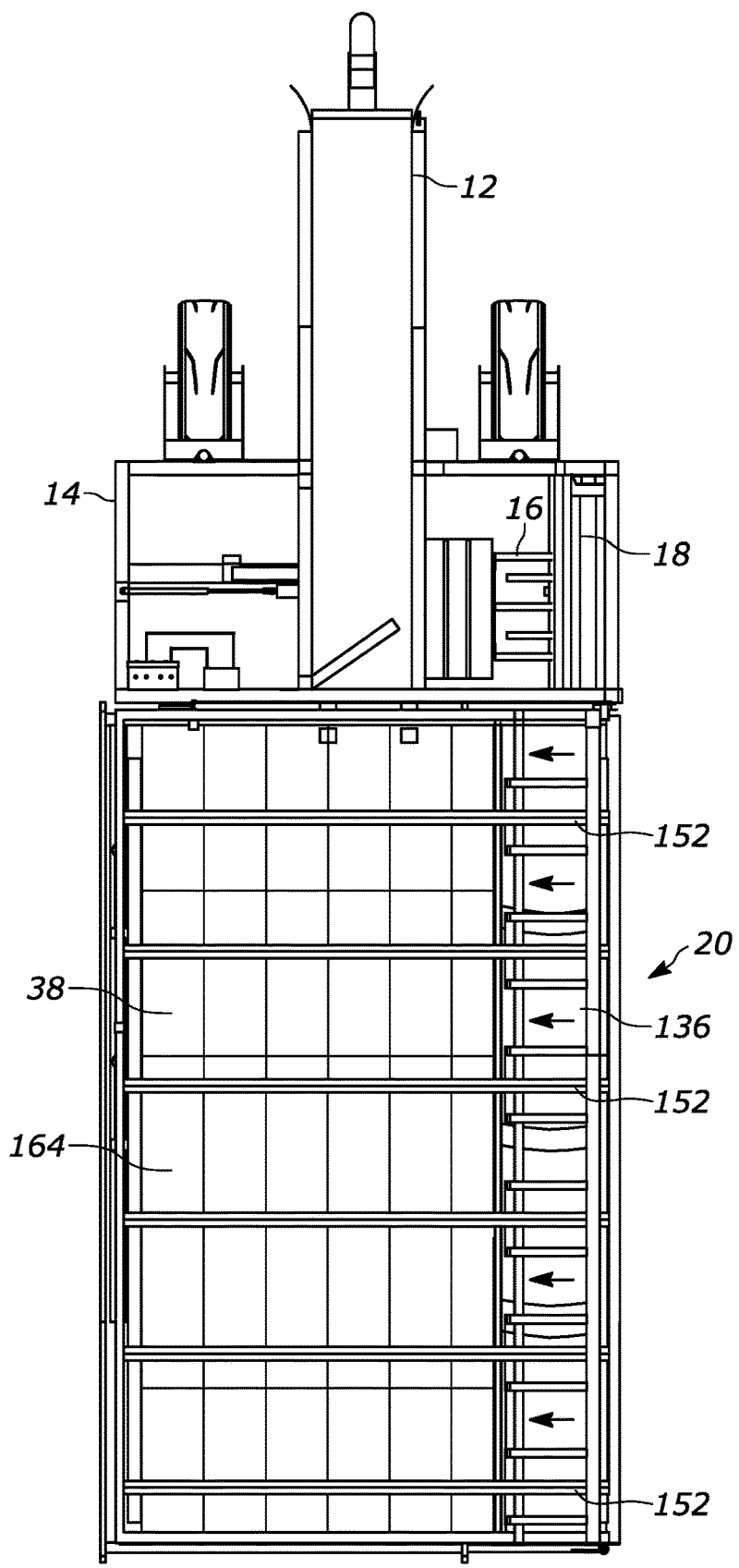
FIG. 12 is a top view of a bale accumulator according to an aspect of the disclosure, including an exemplary depiction of the movement of a column of bales by a fence ram.
Figure 13:
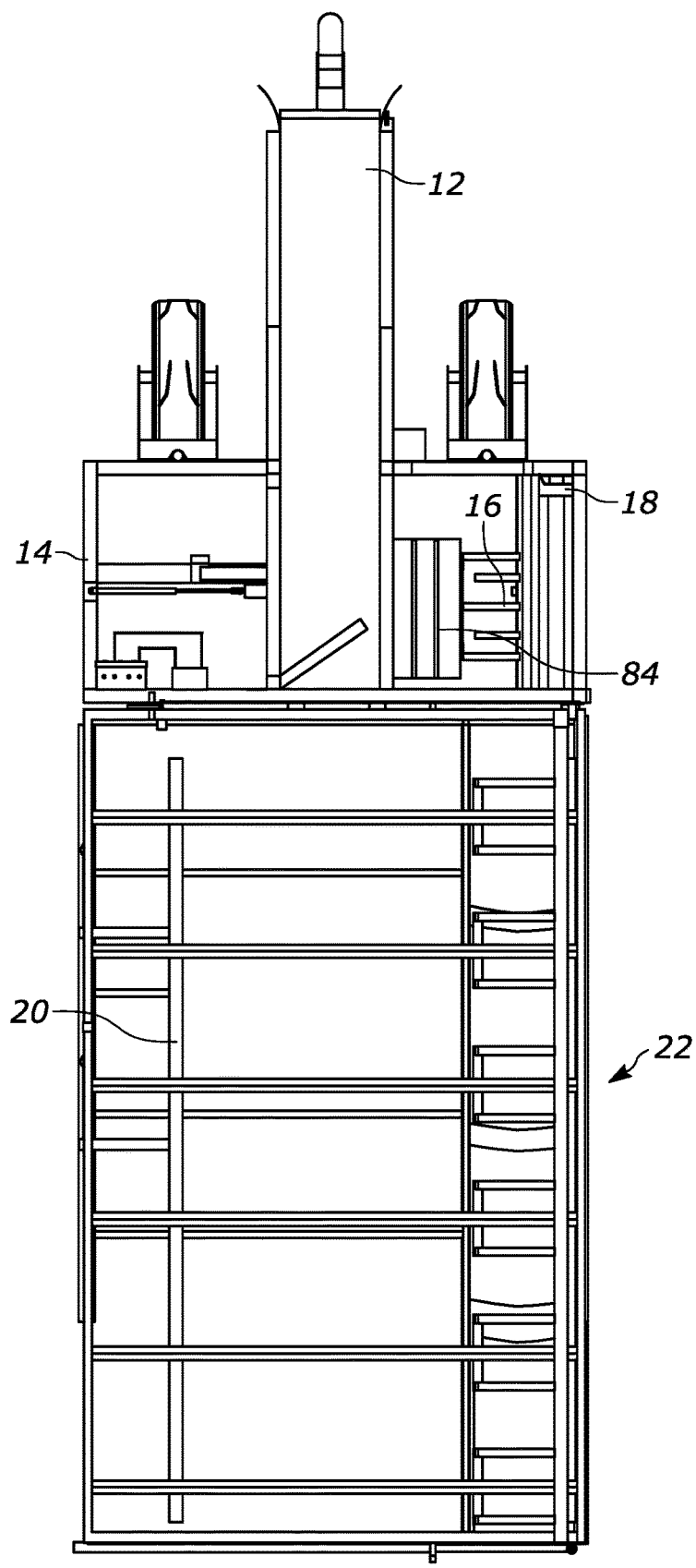
FIG. 13 is a top view of a bale accumulator according to an aspect of the disclosure, including an exemplary depiction of an adjustable fence inset over a bed.
Figure 14:
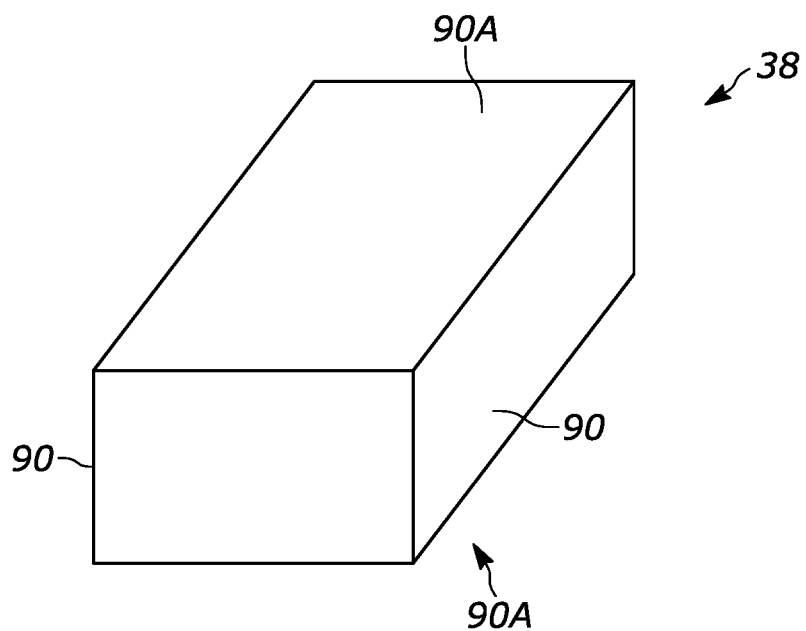
FIG. 14 is a perspective view of exemplary embodiment of a bale according to an aspect of the disclosure.

The disclosure described herein is directed to different aspects of a bale accumulator. The detailed description set forth below, in connection with the appended drawings, is intended as a description of various configurations and is not intended to represent the only configurations in which the concepts described herein may be practiced. These descriptions include specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The disclosure is described herein with reference to certain aspects, iterations, embodiments, and examples but it is understood that the disclosure can be embodied in many different forms and should not be construed as limited to the aspects set forth herein. For instance, reference may be made to a particular side or another of the present invention to orient the invention, however, elements indicated as being on the one side are contemplated being in a mirrored position on the other side without going beyond the scope of the contemplated invention.

Although the terms first, second, etc. may be used herein to describe various elements or components, these elements or components should not be limited by these terms. These terms are only used to distinguish one element or component from another. Hence, a first element discussed herein could be termed a second element without departing from the teachings of the present application. It is understood that actual systems or fixtures embodying the disclosure can be arranged in many different ways with many more features and elements beyond what is shown in the drawings. For the same or similar elements or features, the same reference numbers may be used throughout the disclosure.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure may be described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure.

With reference to the Figures aspects of a bale accumulator 10 are shown according to the disclosure. The bale accumulator 10 comprises one or more of an intake conveyor 12, a push ram 14, a flip tray 16, a trough ram 18, a fence ram 20, an adjustable fence 22, a dovetail assembly 24, and/or a power unit 26 that are mounted or connected to or otherwise comprise a frame 28. In other aspects of the present invention, the bale accumulator 10 can also comprise one or more wheels 30 and/or an adjustable tongue 32 that are also mounted or connected to or otherwise comprise the frame 28. The bale accumulator 10 is described herein in relation to a baler 34 towed or otherwise pulled by a vehicle 36 such as a tractor, to collect material and form one bale or a plurality of bales 38 having a rectangular shape, however, alternative configurations and operations are contemplated, and the described relationship is only provided for ease of understanding without limiting the scope of the present invention.

In some aspects of the present invention, the intake conveyor 12 is configured to extend from a front 40 of the frame 28 (and/or bale accumulator 10 as broadly disclosed herein) in a generally flat arrangement when positioned on a ground surface 42 that is substantially flat. In such a configuration, the intake conveyor 12 extends from a loading end 44 adjacent or abutting the baler 34 and an unloading end 46 within the frame 28. In other aspects, the unloading end 46 terminates before the remainder of the frame 28 such that the entirety of the intake conveyor 12 extends from the frame 28.

In other aspects, the intake conveyor 12 comprises a first guide barrier 48 and in another aspect, a second guide barrier 50. The first guide barrier 48 is positioned to extend along a length of a first side 52 of the intake conveyor 12 between the loading end 44 and the unloading end 46.

The second guide barrier 50 is positioned to extend along a length of a second side 54 of the intake conveyor 12 between the loading end 44 and the unloading end 46. The first guide barrier 48 and/or second guide barrier 50 are configured to prevent the bale 38 from falling off the intake conveyor 12 during transport from the baler 34 onto the bale accumulator 10. In certain aspects, the first guide barrier 48 and/or second guide barrier 50 terminate against the front 40 of the frame 28.

In still other aspects aspect, a first flexible barrier 56 extends from the first guide barrier 48 to or beyond the loading end 44 of the intake conveyor 12. In other aspects, a second flexible barrier 58 extends from the second guide barrier 50 to or beyond the loading end 44 of the intake conveyor 12. In some aspects, the first flexible barrier 56 and/or second flexible barrier 58 are configured to connect to the baler 34 adjacent a discharge port 60 of the baler 34. In such configurations, the first flexible barrier 56 and/or second flexible barrier 58 prevent the bale 38 from falling off the intake conveyor 12 when the bale accumulator 10 is pulled along a path that is not straight (e.g., turning) as the first flexible barrier 56 and/or second flexible barrier 58 will flex in the direction the bale accumulator 10 is being pulled and thereby guide the bale 38 onto the intake conveyor 12. In certain aspects, the first flexible barrier 56 and/or second flexible barrier 58 comprise a strap 62 that is mounted to the first guide barrier 48 and/or second guide barrier 50 at one end and have a connecting member 64 such as a hook on the opposing end.

In further aspects of the present invention, the frame 28 comprises a loading barrier 66 that extends substantially perpendicularly or perpendicularly to the intake conveyor 12. In such configurations, the loading barrier 66 prevents the bale 38 from travelling beyond the unloading end 46 of the intake conveyor 12.

In other aspects, the push ram 14 comprises an actuating push arm 68, a push face 70, and/or a support arm 72. In some aspects, the push ram 14 is positioned to the first side 52 of the intake conveyor 12 and extends from a first side 74 of the frame 28 (and/or bale accumulator 10 as broadly disclosed herein). In some such aspects, the push ram 14 extends between the first side 74 of the frame 28 to the first side 52 of the intake conveyor 12 such that the actuating push arm 68 extends from or near the first side 74 of the frame 28 to the push face 70 that is positioned adjacent to or abutting the intake conveyor 12 adjacent to or abutting the unloading end 46. Hence, when unactuated, the push face 70 extends substantially from the first guide barrier 48 to the loading barrier 66 thereby preventing the bale 38 from moving towards the first side 74 of the frame 28.

The support arm 72, in some aspects, connects to an outer edge 76 of the push face 70 and extends to the actuating push arm 68. In this configuration, the support arm 72 provides the advantage of adding rigidity to the push face 70 to prevent torsion during operation and further extends the operable lifetime of the push ram 14.

In further aspects, the bale accumulator 10 comprises a push ram trip or trigger 78 that is configured to actuate the push ram 14. As shown in the exemplary embodiments of the Figures, the push ram trip 78 in some aspects comprises a pressure plate or rod 80 that is spring loaded and positioned adjacent to the front 40 of the frame 28. In still further aspects, the push ram trip 78 extends outwardly at an angle away from the front 40 and the first side 74 of the frame 28 such that the push ram trip 78 extends over the intake conveyor 12 from the unloading end 46. In this configuration, the push ram trip 78 is positioned to be actuated by the bale 38 upon or nearly upon travelling to the unloading end 46 of the intake conveyor 12. In other aspects, the push ram trip 78 is a sensor that sends a signal to cause the actuation as discussed within the scope disclosed herein. In such configurations, the use of the sensor, such as a motion sensor, as the push ram trip 78 requires additional software and other related components that adds complexity to the system thereby increasing costs and additional points of failure.

In other aspects, upon actuation of the push ram trip 78 the push ram 14 is actuated. The actuation of the push ram 14 causes the push ram 14 to extend laterally towards a second side 82 of the frame 28 (and/or bale accumulator 10 as broadly disclosed herein). In some aspects, the push ram 14 is hydraulically actuated and the actuating push arm 68 comprises a telescoping hydraulic cylinder that is connected to the push face 70 and support arm 72.

As the push ram 14 extends laterally, the bale 38 is pushed off the intake conveyor 12 towards the second side 82 of the frame 28. In some aspects, the push ram 14 pushes the bale 38 onto a storage surface 84 positioned adjacent or abutting the second side 54 of the intake conveyor 12. The storage surface 84 provides the advantage of allowing additional bales 38 to be stored once the bale accumulator 10 is otherwise filled as described further herein.

In some aspects, the flip tray 16 is positioned adjacent to or abutting the storage surface 84. In this position, the flip tray 16 is positioned between the storage surface 84 and the second side 82 of the frame 28. In further aspects of the present invention, the flip tray 16 comprises a flip face 86 that is pivotally connected to the frame 28 about an end 88 of the flip face 86 nearest the second side 82 of the frame 28 such that upon actuation, the flip face 86 rotates upwardly and towards the second side 82 of the frame 28. In this configuration, the flip tray 16 rotates the bale 38 positioned on the flip tray 16 onto an edge or side 90 of the bale 38 (i.e., a 90° rotation of the bale 38 for a base surface 90A—with a larger surface area), wherein the edge 90 is the smaller elongated surface of the bale 38. In some aspects, the flip tray 16 is hydraulically actuated. This configuration allows for a greater number of the bales 38 to be stored on the bale accumulator 10 during loading as described further herein. In other aspects, the flip tray 16, when unactuated, lays flush or substantially flush along a plane extending through the storage surface 84 and/or intake conveyor 12.

In further aspects, the bale accumulator 10 comprises a flip tray trip or trigger 92 that is configured to actuate the flip tray 16. In some aspects, the flip tray trip 92 is positioned adjacent to or abutting the end 88 of the flip tray 16. As shown in the exemplary embodiments of the Figures, the flip tray trip 92 in some aspects comprises a pressure plate or rod 94 that is spring loaded and actuates in the direction of the second side 82 of the frame 28. In still further aspects, the flip tray trip 92 extends upwardly from the flip tray 16. In this configuration, the flip tray trip 92 is positioned to be actuated by the bale 38 being pushed off the storage surface 84 by another of the bales 38 being pushed from the intake conveyor 12 by the push ram 14 and into the flip tray trip 92. In other aspects of the present invention, the storage surface 84 is excluded and the push ram 14 pushes the bale 38 directly onto the flip tray 16 thereby causing the actuation of the flip tray trip 92 without another of the bales 38 being acted upon by the push ram 14. In other aspects, the flip tray trip 92 is a sensor, such as a motion sensor, that sends a signal to cause the actuation as discussed within the scope disclosed herein. In such configurations, the use of the sensor as the flip tray trip 92 requires additional software and other related components that adds complexity to the system thereby increasing costs and additional points of failure.

In other aspects, the trough ram 18 is positioned adjacent to or abutting the flip tray 16 such that the trough ram 18 is positioned between the flip tray 16 and the second side 82 of the frame 28. In aspects of the present invention, the trough ram 18 comprises an actuating trough arm 96 and/or a trough ram face 98. In certain aspects of the present invention, the actuating trough arm 96 is positioned and connected below a bottom 100 of the frame 28 (and/or bale accumulator 10 as broadly disclosed herein) and extends from the front 40 of the frame 28 towards a rear 102 of the frame 28 (and/or bale accumulator 10 as broadly disclosed herein) when unactuated. In other aspects, the trough ram face 98 is connected to an end 104 of the actuating trough arm 96 nearest the front 40 of the frame 28 and the trough ram face 98 extends upwardly such that the trough ram face 98 is positioned in perpendicular relation to the intake conveyor 12. In particular aspects, the trough ram face 98 is a plate bent at an angle, which provides the advantage of guiding the bale 38 during transport by the trough ram 18. When actuated, the actuating trough arm 96 is retracted towards the rear 102 of the frame such that the bale 38, after being flipped, is pushed longitudinally towards the rear 102 of the frame 28 by the trough ram face 98 onto a trough 106 extending along the length of some or all of the remainder of the second side 82 of the frame 28. In some aspects, the push ram 14 is hydraulically actuated and the actuating trough arm 96 comprises a telescoping hydraulic cylinder.

In still further aspects, the flip tray trip 92 is configured to actuate the trough ram 18 and the flip tray 16. In some such aspects, the flip tray trip 92 is configured to delay the actuation of the trough ram 18. In other aspects, the trough ram face 98 is in an offset position such that the trough ram face 98 is positioned behind the flip tray 16 in the direction of the front 40 of the frame 28. In this configuration, the trough ram face 98 is actuated at the same time as the flip tray 16 but the offset allows ample time for the bale 38 to be flipped onto the trough ram 18 before being engaged by the trough ram 18. In other aspects, the trough ram 18 is actuated by a trough ram trip or trigger 108 (not shown), which in some aspects include a sensor, such as a motion sensor. In such configurations, the use of the sensor as the trough ram trip 108 requires additional software and other related components that adds complexity to the system thereby increasing costs and additional points of failure. In other aspects of the present invention, the storage surface 84 and the flip tray 16 is excluded, and the push ram 14 pushes the bale 38 directly onto the trough ram 18 thereby causing the actuation of the trough ram 18 without flipping the bale 38 onto the edge 90 of the bale 38.

In yet other aspects, the trough ram 18 is positioned between a trough ram floor 110 that has a channel 112 through which the actuating trough arm 96 extends. In particular aspects, the actuating trough arm 96 has an L-shape, which in such a configuration provides for the actuating trough arm 96 to partially extend horizontally below the trough ram floor 110 and to partially extend vertically through the channel 112 of the trough ram floor 110 thereby providing a path for the trough ram 18 to actuate along without interference while the trough ram floor 110 provides an area for the bale 38 to be loaded onto during operation.

In particular aspects, a trough ram barrier 114 extends upwardly from the second side 82 of the frame 28 and is adjacent to or abuts the trough ram 18. In some configurations, the trough ram barrier 114 extends from the front 40 of the frame 28 to the fence ram 20 along the second side 82 of the frame 28. In such configurations, the trough ram barrier 114 prevents the bale 38 from being pushed or falling off the second side 82 of the frame 28 upon being flipped or otherwise transported from the baler 34.

In further aspects, the trough 106 is angled upwardly in relation to the bottom 100 of frame 28 as the trough 106 extends from the second side 82 of the frame 28 towards the first side 74 of the frame 28. In this configuration, the bale 38 is tilted towards the second side 82 of the frame 28 against the fence ram 20 so that during transport of the bale 38 and the movement of the bale accumulator 10 generally, the bale 38 is less likely to fall over towards the first side 74 of the frame 28.

In other aspects, the fence ram 20 is positioned along the length of the second side 82 of the frame 28 between the trough ram barrier 114 and the rear 102 of the frame 28. In still other aspects, the fence ram 20 comprises an actuating fence arm 116, one or more linkages 118, and a fence face 120. In some aspects, the actuating fence arm 116 extends below the bottom 100 of the frame 28 from adjacent to or abutting the trough ram floor 110 to adjacent to or abutting the rear 102 of the frame 28. In still other aspects, the actuating fence arm 116 is separately mounted to a fence hydraulic cylinder 122.

The one or more linkages 118, in yet other aspects, are rotatably mounted to the frame 28 and extend upwardly from the actuating fence arm 116 and through the trough 106, connecting to the fence face 120. In particular aspects, each of the one or more linkages 118 comprise a cylindrical member 124, an arm connecting member 126, and a face connecting member 128. In such configurations, the cylindrical member 124 is received over a post 130 extending from the bottom 100 of the frame 28 and the arm connecting member 126 is fixedly connected to the cylindrical member 124 at or adjacent one end 132 and rotatably connected to the face connecting member 128 at or adjacent an opposing end 134.

Additionally, fixedly connected to and extending outwardly and upwardly from the cylindrical member 124 is the face connecting member 128, which connects or rotatably connects to the fence face 120. In some aspects, the face connecting member 128 has an L-shape. In this configuration, the actuation of the actuating fence arm 116 rotates the arm connecting member 126 about the cylindrical member 124 therefore rotating the cylindrical member 124 and the face connecting member 128 about the same rotation. In this fashion, the actuation of the actuating fence arm 116 rotates the arm connecting member 126 from extending towards the second side 82 of the frame 28 to towards the rear 102 and first side 74 of the frame 28, and in doing so moves the face connecting member 128 towards the first side 74 of the frame 28 as well, thereby also moving the fence face 120 during operation as the connection point between the face connecting member 128 and the fence face 120 is transitioned towards the first side 74 of frame 28. In aspects where the connection between the face connecting member 128 and the fence face 120 is rotatable in nature, the fence face 120 travels a smooth path during operation thereby limiting the potential for the bale 38 to topple over during transition.

In particular aspects, the fence ram 20 is configured to transition from the second side 82 of the frame 28 a sufficient distance to cross and/or pass entirely over the trough 106 such that the bale 38 is pushed off of the trough 106 in the direction of the first side 74 of the frame. In further aspects, the fence face 120 has an elongated rectangular shape to sufficiently make contact with the bale 38 during the push while also acting as a barrier to prevent the bale 38 from falling off the bale accumulator 10 during movement of the bale accumulator. In other aspects of the present invention's configuration and operation, the fence ram 20 is retracted by the arm connecting member 126 being retracted thereby causing the one or more linkages 118 to rotate back such that the arm connecting member 126 once again extends towards the second side 82 of the frame 28 and in doing so moves the fence face 120 back into position along the second side 82 of the frame 28 as the face connecting member 128 rotates with the cylindrical member 124.

In some aspects, the one or more linkages 118 each extend through one of at least one slot 136 in the trough 106. The plurality of slots 136, in further particular aspects, are arcuate in shape such that the plurality of slots 136 conform to the path travelled by the one or more linkages 118 during the operation described herein.

In further aspects, the bale accumulator 10 comprises a fence ram trip or trigger 138 that is configured to actuate the fence ram 20, which in other aspects comprises the operation detailed herein, including by way of hydraulic action. As seen in the exemplary embodiments of the Figures, the fence ram trip 138 in some aspects comprises a pressure plate or rod 140 that is spring loaded and positioned adjacent to the rear 102 of the frame 28. In still further aspects, the fence ram trip 138 extends outwardly at an angle away from the second side towards the rear 102 of the frame 28 such that the fence ram trip 138 extends over the trough 106. In this configuration, the fence ram trip 138 is positioned to be actuated by the bale 38 upon or nearly upon travelling to the rear 102 of the frame 28. In other aspects, the fence ram trip 138 is a sensor that sends a signal to cause the actuation as discussed within the scope disclosed herein. In such configurations, the use of the sensor, such as a motion sensor, as the fence ram trip 138 requires additional software and other related components that adds complexity to the system thereby increasing costs and additional points of failure.

In particular aspects, the length of the trough 106 dictates the number of the bales 38 that must be loaded into the trough 106 by the fence ram 18 before the fence ram trip 138 is actuated due to the position of the fence ram trip 138 being positioned adjacent or abutting the rear 102 of the frame 28. As shown in the exemplary embodiments of the Figures, a total of six of the bales 38 must be loaded into the trough 106 for such actuation to take place.

In yet further aspects, the bale accumulator comprises a bed 142 that is mounted to the frame 28 and extends from the loading barrier 66 to the rear 102 of the frame, and from the trough 106 to the second side 82 of the frame 28. In other aspects, the bed 142, and the bale accumulator 10 in general, extend in a substantially parallel relation with a ground surface 144 that the bale accumulator 10 is being pulled about such that the bale accumulator does not rely upon gravity for operation. In particular aspects, the bed 142 is sized and shaped to receive a total of forty-two of the bales 38 during operation described herein, which comprise seven rows of six columns of the bales 38 before the bed 142 is fully loaded. In some aspects, an additional number of the bales 38 can be loaded into the trough 106, such as five, to allow a total of forty-seven of the bales 38 to be carried on the trough 106 and bed 142. In yet other particular aspects, one of the bales 38 can be also stored on the storage surface 84 adjacent the intake conveyor 12 such that a total of forty-eight of the bales can be carried without overloading the bale accumulator 10. The present disclosure, however, contemplates a variety of arrangement and configurations to store more or less of the bales 38 within the spirit of the present invention.

In other aspects, the frame 28 and/or the bale accumulator 10 comprises a stabilizer frame 146, which extends over or partially over the top of the frame 28 and connects to the frame 28. In some aspects, the stabilizer frame 146 comprises a first side 148, a second side 150, one or more stabilizers 152, a front side 154, a rear side 156, and/or one or more trough gates 158.

The first side 148 of the stabilizer frame 146, in some aspects, extends along the first side 74 of the frame 28 and in particular aspects between and/or to the front 40 and the rear 102 of the frame 28. In other aspects, the first side 148 extends between and/or to the trough ram barrier 114 to the rear 102 of the frame 28. The first side 148, in some aspects, forms a first side opening 160 with the frame 28 that extends along the length of the first side 148 of the stabilizer frame 146. In still other aspects, the trough ram barrier 114 and/or the fence ram 20 are positioned within the first side opening 160.

In further still aspects, the second side 150 of the stabilizer frame 146 extends along the second side 82 of the frame 28 and in some aspects between and/or to the front 40 and the rear of the frame 28. In some aspects, the second side 150 extends between and/or to the loading barrier 66 and the rear 102 of the frame 28. A second side opening 162, in some aspects, is formed by the second side 150 of the stabilizer frame 146 and the frame 28 that extends along a length of the second side 150 of the stabilizer frame 146. In further aspects described herein, the adjustable fence 22 is positioned within the second side opening 162 when not extended as discussed further herein.

In yet other aspects, the one or more stabilizers 152 configured to prevent the bales 38 from falling over during transport and to also, in some aspects, rotate to allow the bales 38 to be unloaded from the bed 142 as described further herein. The one or more stabilizers 152 extend laterally between the first side 148 and the second side 150 of the stabilizer frame 146, which in other aspects provides for the one or more stabilizers 152 to extend over the trough 106 and/or the bed 142. In other aspects, the one or more stabilizers 152 are rotatably connected to the first side 148 and the second side 150 of the stabilizer frame 146. In yet other aspects, the stabilizer frame 146 is configured such that the first side 148 and second side 150 are positioned above or in alignment with a top 164 of the bale 38, such that the one or more stabilizers 152 extend below the first side 148 and the second side 150. However, in some aspects, when the bales 38 are unloaded, the connection of the one or more stabilizers 152 provides a rotation about the first side 148 and the second side 150 such that the distance the one or more stabilizers 152 extend below the first side 148 and the second side 150 is a lesser distance when rotated by the bale 38 during unloading. To this end, the one or more stabilizers 152 are configured with a triangular or upside-down V-shape in some aspects of the present invention. In such configurations, the weight of the one or more stabilizers 152 causes gravity to rotate the one or more stabilizers 152 such that the opening of the V-shape points downward, however, during unloading, the one or more stabilizers 152 rotate outwardly and upwardly such that a flat surface 166 of the one or more stabilizers 152 contacts the top 164 of the bale 38 thereby allowing the bales 38 to be unloaded. Once the bales 38 are unloaded and no longer cause the rotation of the one or more stabilizers 152, gravity again returns the one or more stabilizers 152 to a position where the opening of the V-shape points downward to again engage the top 164 of the bale 38 to stabilize the bales 38 during loading and transport.

In further aspects, the front side 154 extends between the first side 148 and second side 150 of the stabilizer frame 146 adjacent to or above the front 40 of the frame 28 and/or the loading barrier 66. In certain aspects, the front side 154 forms a front side opening 168 with the frame 28 and/or the first side 148 and second side 150 of the stabilizer frame 146. In some aspects, the loading barrier 66 is positioned within the front side opening 168. In still further aspects, the rear side 156 extends between the first side 148 and second side 150 of the stabilizer frame 146 adjacent to or above the rear 102 of the frame 28. In certain aspects, the rear side 156 forms a rear side opening 170 with the frame 28 and/or the first side 148 and second side 150 of the stabilizer frame 146.

In some aspects of the present invention, the one or more trough gates 158 comprises a front bracket 172, a rear bracket 174, a rod 176, one or more angled arms 178, one or more cross members 180, and/or a stop 182. In yet further aspects, the one or more trough gates 158 are configured to connect to the stabilizer frame 146 and to prevent the bale 38 from falling over from the trough 106 onto the bed 142 while the trough 106 is loaded and the bale accumulator 10 is pulled about. In still further aspects, the one or more trough gates 158 is configured to be rotatably connected to the stabilizer frame 146 and to operate by way of gravity such that the bale 38 is rotated out of the way of the bale 38 when the fence ram 20 pushes the bale 38 off the trough 106 and onto the bed 142. Once the bale 38 is pushed onto the bed, the one or more trough gates 158 is configured to return to a natural state as the result of gravity acting on the one or more trough gates 158.

In yet other aspects, the front bracket 172 is mounted or connected to the front side 154 of the stabilizer frame 146 and the rear bracket 174 is mounted or connected to the rear side 156 of the stabilizer frame 146. The rod 176 is received and retained in aligned openings 184 of the front bracket 172 and the rear bracket 174 such that the rod 176 extends along the second side 82 of the frame 28 between the front 40 and rear 102 of the frame 28. In particular aspects, the rod extends from adjacent to or abutting the rear 102 of the frame 28 to adjacent to or abutting the trough ram barrier 114. The aligned openings 184 of the front bracket 172 and the rear bracket 174, in some aspects, are circular and the rod 176 is cylindrical or tubular such that the rod 176 is rotatably received within the front bracket 172 and the rear bracket 174. In particular aspects, the front bracket 172 and the rear bracket 174 are positioned above the stabilizer frame 146 such that the rod 176 extends above the stabilizer frame 146 thereby not obstructing the bales 38 as the bales 38 are loaded onto the trough 106.

In additional aspects of the present invention, the one or more angled arms 178 connect to the rod 176 such that the rotation of the rod 176 results in the rotation of the one or more angled arms 178. In other aspects, the one or more angled arms 178 comprise an angled portion 186 and a vertical portion 188. When one or more trough gates 158 are not being acted upon and are in a natural position, the angled portion 186 extends outwardly and downwardly from the rod 176 in the direction of the first side 74 of the frame 28 and the bed 142. In some such aspects, the angled portion 186 extends beyond the trough 106. Extending downwardly from the angled portion 186 is the vertical portion 188 that extends towards the bed 142. In the discussed configuration of these aspects, the one or more angled arms 178 extend over the bale 38 when the bale 38 is in the trough 106 to prevent the bale 38 from falling on to the bed 142.

In some aspects, the one or more angled arms 178 are configured with at least two of the one or more angled arms 178 positioned between the stabilizers 152 that are positioned immediately adjacent to one another. In such aspects, the at least two of the one or more angled arms 178 comprise the cross member 180 extending between the at least two of the one or more angled arms 178. In this configuration, the cross member 180 provides rigidity to the one or more angled arms 178 while also providing additional surface for the bale 38 to engage thereby limiting the potential for the bale 38 to topple. In some configurations, the cross member 180 extends beyond the at least two of the one or more angled arms 178.

In other aspects, the stop 182 is connected to the stabilizer frame 146, and in particular aspects, the stop 182 is connected to the front side 154 and/or the rear side 156 of the stabilizer frame 146. In some aspects, the stop 182 is configured to prevent the one or more angled arms 178 from rotating beyond a predefined position, including such configurations where the vertical portion 188 of the one or more angled arms 178 extends vertically or substantially vertically. In some such configurations, the stop is positioned at, adjacent, or abutting the transition between the trough 106 and the bed 142. In particular aspects, the stop 182 attached below the front side 154 and is positioned to engage the angled portion 186 of one of the one or more angled arms 178 thereby stopping any other of the one or more angled arms 178 from moving beyond the stop 182 due to the connection of all of the one or more angled arms 178 connecting to the rod 176.

In still further aspects, the operation of the fence ram 20 causes the fence face 120 to engage the one or more angled arms 178 and/or the one or more cross members 180 thereby moving them upwardly and outwardly about the rod 176. In certain aspects, the bales 38, upon being acted upon by the fence ram 20 move the one or more trough gates 158 through direct engagement with sufficient force provided by the fence ram 20 to move the one or more angled arms 178 from obstructing the bales from entering the bed 142. Once the bales 38 are transitioned to the bed 142 and the fence ram 20 retracts, gravity causes the one or more angled arms 178 to rotate back to the position resulting in contact with the stop 182.

In other aspects, the adjustable fence 22 is positioned along the length of the first side 74 of the frame 28 between the loading barrier 66 and the rear 102 of the frame 28. In still other aspects, the adjustable fence 22 comprises one or more of a rotatable arm 190 and an adjustable fence face 192. In further aspects, the rotatable arm 190 is connected to the frame 28 and in particular aspects, to the second side 82 of the frame 28. In some aspects, the rotatable arm 190 comprises a post 194 and an adjustable arm 196. In certain aspects, the post 194 extends upwardly from the second side 82 of the frame 28 and receives a cylindrical member 198 of the adjustable arm 196. In such configurations, the cylindrical member 198 provides the ability for the adjustable arm 196 to rotate about the post 194 in a hinged fashion. In still other aspects, the adjustable arm 196 connects to and between the post 194 and the adjustable fence face 192. In particular aspects, two or more of the rotatable arms 190 connect to the adjustable fence face 192.

In one position according to aspects of the present invention, the adjustable arm 196 extends in substantial alignment with the second side 82 of the frame 28 and in such arrangement the adjustable fence 22 is positioned adjacent to or abutting the second side 82 of the frame 28 as well. In this position, more of the bales 38 can be loaded onto the bed 142 as the adjustable fence 22 extends a minimal distance over the bed 142. In a second position, the adjustable arm 196 is rotated outwardly about the post 194 until the adjustable arm 196 extends from the second side 82 towards the first side 74 of the frame 28. In this configuration, the adjustable fence face 192 is moved away from the second side 82 of the frame 28 further into and over the bed 142. In certain aspects, the size and shape of the adjustable arm 196 in combination with the adjustable fence face 192 is such that in the latter position the adjustable fence 22 extends over the bed 142 a distance equal to or substantially equal to the edge 90 of the bale 38. In this position, this limits the number of the bales 38 that can be loaded by an entire column of the bales 38. The use of the adjustable fence 22 allows to limit the number of the bales 38 needed to fill the bed 142 from the trough 106 to the adjustable fence 22.

In some aspects, the bale accumulator 10 further comprises a load indicator assembly 200 configured to indicate when the bed 142 is fully loaded with the bales 38. In further aspects, the load indicator assembly 200 comprises a load trip or trigger 202, a load indicator actuating arm 204, and a load indicator 206.

In further aspects of the present invention, the load trip 202 is configured to be tripped by the bale 38 being loaded onto the bed 142 adjacent to or abutting the adjustable fence 22 and/or the furthest possible position away from the second side 82 of the frame 28 permitted during loading of the bales 38 such that the bales 38 would not reach the load trip 202 until the bed 142 until the bales 38 extended laterally across the bed 142. In still further aspects, the load trip 202 is connected to and/or positioned on one or more of the positions of the frame 28 and/or stabilizer frame 146, including adjacent to or abutting: the front 40, second side 82, and/or rear 102 of the frame 28, and/or the front side 154, the rear side 156, and/or the second side 150 of the stabilizer frame 146. As seen in the exemplary embodiments of the Figures, the load trip 202 in some aspects comprises a pressure plate or rod 208 that is spring loaded and in an unactuated position extends over the bed 142 such that the bale 38 will compress the plate 208 through physical engagement. In other aspects, the load trip 202 is a sensor that sends a signal to cause the actuation as discussed within the scope disclosed herein. In such configurations, the use of a sensor, such as a motion sensor, as the load trip 202 requires additional software and other related components that adds complexity to the system thereby increasing costs and additional points of failure.

In some aspects, the load trip 202 is configured to actuate the load indicator actuating arm 204, which in other aspects of the present invention extends along the front 40 of the frame 28 and/or the front side 148 of the stabilizer frame 146. In further aspects, the load indicator actuating arm 204 is contacted to an actuating plate 210. In still further aspects, the load indicator 206 is also connected to the actuating plate 210. In such configurations, the load indicator actuating arm 204 retracts resulting in the actuating plate 210 to transition the load indicator 206 from a substantially horizontal position to an upright or vertical position. Yet in other aspects, the load indicator 206 is a flag. As disclosed in aspects herein, the tripping of the load trip 202 results in the load indicator actuating arm 204 retracting, thereby causing the actuating plate 210 to pull the load indicator 206 into the upright position. When the load indicator 206 is positioned in an upright position, an operator in the vehicle 36 is notified that the bed 142 is fully loaded with the bales 38. During unloading, the movement of the bales 38 removes the trip of the load trip 202 thereby lowering the load indicator 206, or if the load trip 202 is a sensor, the signal for a fully load on the bed 142 stops.

In additional aspects of the present invention, the bale accumulator 10 further comprises an unloading assembly 212 configured to unload the bales 38 from the bed 142 and off the bale accumulator 10. In some aspects, the unloading assembly 212 comprises an apron 214, one or more sprockets 216, one or more roller chains 218, and/or one or more guides 220.

In further aspects, the apron 214 extends around the bed 142 in a continuous fashion from the front 40 to the rear 102 of the frame 28. In other aspects, the apron 214 also extends between the trough 106 to the first side 74 of the frame 28.

In other aspects of the present invention, the one or more sprockets 216 comprise a first pair of sprockets 222 and/or a second pair of sprockets 224. The first pair of sprockets 222 are positioned and/or connected to the frame 28 between the trough 106 and the bed 142 with one of the first pair of sprockets 222 positioned adjacent to or abutting the front 40 of the frame 28 and another of the first pair of sprockets 222 positioned adjacent to or abutting the rear 102 of the frame 28. In still other aspects, a first roller chain 226 of the one or more roller chains 218 is connected around and between the first pair of sprockets 222 in a continuous fashion. In similar aspects, second pair of sprockets 224 are positioned and/or connected to the frame 28 between the bed 142 and the first side 74 of the frame 28 with one of the second pair of sprockets 224 positioned adjacent to or abutting the front 40 of the frame 28 and another of the second pair of sprockets 224 positioned adjacent to or abutting the rear 102 of the frame 28. In still other aspects, a second roller chain 228 of the one or more roller chains 218 is connected around and between the second pair of sprockets 222 in a continuous fashion. In such a configuration, the one or more sprockets 216 and the one or more roller chains 218 are configured to move the apron 214 around the bed 142 such that the bales 38 positioned on the bed 142 are moved of the bed 142 from the rear 102 of the frame 28 during operation.

In some aspects, the one or more guides 220 are configured to engage the bales 38 during onloading to facilitate unloading in combination with the apron 214. In further aspects, the one or more guides 220 extend laterally between and connect to the first roller chain 226 and the second roller chain 228. In this configuration, the one or more guides 220 travel at the same speed during operation as the bed 142 to provide uniform engagement with the bales 38 during unloading.

In other aspects, the bale accumulator 10 comprises the dovetail assembly 24 separately or as part of the unloading assembly 212, which is configured to lower a portion or dovetail 230 of the bed 142 and/or the unloading assembly 212 to unload the bales 38 gently and uniformly. The dovetail 230 of the bed 142 that lowers, in certain aspects, is hingedly connected to the remainder of the bed 142. In some aspects, the dovetail assembly 24 comprises one or more dovetail actuating arms 232 that are connected to a bottom 234 of the dovetail 230 and to the frame 28 such that the retraction of one or more hydraulic arms 232 lowers the dovetail 230 while the inverse operation raises the dovetail 230 a position level with the remainder of the bed 142.

In further aspects of the present invention, the operation of the unloading assembly 212 and dovetail assembly 24 and/or the dovetail assembly 24 is controlled by the operator by way of a controller 236 located in the vehicle 36 through separate or single combined command. In this configuration, the operator controls the location that the bales 38 are unloaded rather than having the process being entirely automated resulting in the bales 38 being unloaded in a place the operator does not desire. In other aspects, however, the operation of the unloading assembly 212 and dovetail assembly 24 are automated such as by way of the actuation of the load indicator assembly 200 and/or a determination by the controller 236 that the bale accumulator 10 is in a desirable position for unloading, e.g., the ground surface 42 is flat and/or level.

In other aspects, the bale accumulator 10 comprises a dovetail indicator assembly 238 that is configured to indicate the position of the dovetail 230, e.g., in a lowered or raised position. In certain aspects, the dovetail indicator assembly 238 comprises a dovetail indicator 240, such as a flag, that is connected to the dovetail 230, which in particular aspects is accomplished by way of a tether 242 that is configured to rotate the dovetail indicator 240 between a first position and a second position that are indicative of the dovetail 230 being in either a lowered or raised position. In other aspects, the dovetail indicator 240 is a signal sent to the controller 236 to indicate the position of the dovetail 230. In such configurations, the use of a sensor, such as a position sensor, as the dovetail indicator 240 requires additional software and other related components that adds complexity to the system thereby increasing costs and additional points of failure.

In additional aspects of the present invention, the bale accumulator 10 comprises the power unit 26, which is configured to provide power to one or more of the push ram 14, the flip tray 16, the trough ram 18, the fence ram 20, the adjustable fence 22, dovetail assembly 24, unloading assembly 212, and/or other elements disclosed herein that are disclosed as operating under natural forces such as physical engagement with the bale 38 or gravity but are capable of being powered. In other aspects, the power unit 26 is configured to work independently or in combination with power provided by the vehicle 36. In some such configuration, power lines 244 (such as electrical and/or hydraulic lines) are connected to the power unit 26 to removably attach to the vehicle 36 to receive such power. Still further aspects, the power unit 26 is configured to provide electrical and/or hydraulic power, which in yet other aspects are manually adjustable to alter the operation of the bale accumulator 10, e.g., increasing the hydraulic power to increase the speed of operation of the push ram 14.

In further aspects, the bale accumulator 10 comprises one or more wheels 30 that comprise one or a pair of caster wheels or dolly wheels 246 that are connected to the front 40 of the frame 28. The use of one or a pair of caster wheels 246 provides for tightening the turning radius of the bale accumulator 10 and thereby improves the trailing of the bale accumulator 10 during operation.

In other aspects, the bale accumulator comprises the adjustable tongue 32, which is configured to transition between a first or short position for connection to the baler 34 thereby placing the baler 34 in a near adjacent or abutting position to the intake conveyor 12, and a second or long position for connection to the vehicle 36 during transport when the bale accumulator 10 is not in operation. In some aspects, the adjustable tongue 32 is adjustable telescopically.

In an exemplary generalized operation discussing certain aspects without limitation to others, including other aspects and operations described herein, the bale 38 is loaded onto the intake conveyor 12 in any variety of ways, including by a second operator placing the bale 38 on the intake conveyor 12 or being directly discharged from the baler 34. Once the bale 38 is on the intake conveyor 12, the bale 12 is conveyed rearwards until the push ram trip 78 is actuated by the bale 38. In certain aspects of operation, the intake conveyor 12 is positioned in a medial position of the bale accumulator 10 such that the intake conveyor 12 conveys the bale 38 rearwards towards a medial position on the bale accumulator. When tripped, the push ram 14 extends laterally from the first side 74 towards the second side 82 of the bale accumulator 10, thereby engaging the bale 38 to push the bale 38 off the intake conveyor 12 and onto the flip tray 16.

Upon loading onto flip tray 12, the flip tray trip 92 is actuated by the bale 38. When tripped, the flip tray 12 pivots about the end 88 of the flip tray 12 so that the bale 38 is flipped onto the edge 90 of the bale 38. In this process, the bale 38 is flipped in the path of the trough ram 18 that is extending away from the front 40 towards the rear 102 of the bale accumulator 10. The bale 38 is engaged by the trough ram 18 and pushed rearwardly onto the trough 106.

Once in the trough 106, the bale 38 is retained in place by at least one of the trough gates 158 and/or at least one of the stabilizers 152. The above process is repeated with additional bales 38 until the trough 106 is fully loaded with the bales 38. This in turn causes the bale 38 that was first loaded into the trough 106 to actuate the fence ram trip 138. When tipped, the fence ram 20 extends laterally from the second side 82 towards the first side 74 of the bale accumulator 10, thereby pushing all the bales 38 in the trough 106 off the trough 106, past the one or more trough gates 158 and onto the bed 142. The one or more stabilizers 152 maintain the bales 38 on the edge 90 of each of the bales 38. This process is repeated until the bales 38 fill the bed 142 resulting in the load indicator 206 being tripped.

Although more of the bales 38 can be loaded onto the bale accumulator 10 through storage in the trough 106, the intake conveyor 12, and/or the storage surface 84, the operator can select a location to unload the bales 38 that is convenient. When the desired location is reached, the operator activates the unloading assembly 212, which actuates the apron 214 wrapped around the bed 142 to rotate thereabout to transport the bales 38 off the rear of the bale accumulator 10 and onto the ground surface 42. Simultaneously, the one or more guides 220 that extend across the bed 142 facilitate transport by engaging the bales to push the bales 38 of the bed 142 in a uniform fashion. During unloading, the one or more stabilizers 152 rotate to limit or remove engagement between the one or more stabilizers 152 and the bales 38 so that unloading is unobstructed. Due to the unloading process being operator-directed in particular aspects, the unloading process can take place at any time and in any location, including when the bed 142 is partially full of bales 38

Upon actuation of the unloading assembly 212 or through separate actuation, the dovetail assembly 24 is actuated. This causes the dovetail 230 to angle downwardly towards the ground surface 42 and the rear 102 of the bale accumulator 10 so that the bales 38 are essentially transitioned from the dovetail 230 onto the ground surface 42 rather than simply dropping off the rear 102 of the bale accumulator 10. In this configuration, the bales 38 can be uniformly deposited onto the ground surface 42. To ensure safe operation of the dovetail assembly 24, the dovetail indicator 240 indicates whether the dovetail 230 is in a raised or lowered position.

To modify the number of the bales 38 stored on the bed 142, the adjustable fence 22 is configured to transition from extending along the first side 74 of the bale accumulator 10 to one or more positions inset towards the second side 82 of the bale accumulator 10, which reduces the number of the bales 38 that can be stored on the bed 142 before engaging the adjustable fence 22 and/or tripping the load indicator assembly 200. Additionally, the adjustment of the position of the adjustable fence 22 provides for multiple arrangements of the bales 38 to be formed to conform to the desires of the operator.

During the disclosed operation, the bale accumulator 10 carries out the transportation and arrangement of the bales 38 without reliance on gravity as the bale accumulator 10 is positioned with the intake conveyor 12 and the bed 142 (as well as other elements and/or components discussed herein) extending in parallel or substantially parallel relation with the ground surface 42. Similarly, the operation as discussed herein relies on transport of the bale 38 in lateral and posterior movements, the operation is carried out without raising or lowering the bale 38 at an angle with respect to the contour of the ground surface 42.

The particular operation, including the speed, force, and positioning of some or all of the elements and/or components discussed herein is adjustable, including by adjustment of the power unit 26 and/or the controller 236.

Therefore, a bale accumulator 10 has been provided that provides for unloading at a desired location, provides uniformed unloading of the bales, is adjustable in operation and storage, allows accumulation after the bed is filled, operates in a substantially parallel relationship to a ground surface, provides on demand unloading, and improves upon the art.

From the above discussion and accompanying figures and claims it will be appreciated that the bale accumulator 10 offers many advantages over the prior art. Although the present disclosure and its advantages have been described in detail, it should be understood that various changes, substitutions, modifications, and alterations can be made herein without departing from the technology of the disclosure as defined by the appended claims. The scope of the present application is not intended to be limited to the particular configurations of the process, machine, manufacture, composition of matter, means, methods and steps described in the specification only expressly stated otherwise. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A bale accumulator comprising:
   a frame having a front, a rear, a first side and a second side;
   an intake conveyor extending outwardly from the front of the frame;
   a push ram connected to the frame;
   a trough ram connected to the frame;
   a trough connected to the frame;
   a fence ram connected to the frame;
   a flip tray connected to the frame; and
   an adjustable fence adjustably connected to the frame;
   wherein the push ram is configured to move a bale from the intake conveyor towards the second side of the frame;

wherein the flip tray is configured to flip the bale on an edge of the bale;

wherein the trough ram is configured to move the bale from the front of the frame onto the trough;

wherein the fence ram is configured to move the bale towards the first side onto a bed;

wherein the adjustable fence has a first position along the second side of the frame and a second position inset from the second side of the frame and over the bed.

2. The bale accumulator of claim 1 further comprising a stabilizer frame connected to and above the frame.

3. The bale accumulator of claim 2 further comprising a trough gate rotatably connected to the stabilizer frame and positioned over the trough.

4. The bale accumulator of claim 2 further comprising a stabilizer rotatably connected to the stabilizer frame, wherein the stabilizer is configured to stabilize the bale during transport and rotate when the bale is unloaded.

5. The bale accumulator of claim 1 further comprising a storage surface connected to the frame and positioned between the intake conveyor and the trough ram.

6. The bale accumulator of claim 1 further comprising a pair of dolly wheels connected to the front of the frame.

7. The bale accumulator of claim 1 further comprising a load indicator configured to actuate when the bed is full.

8. The bale accumulator of claim 1 further comprising an unloading assembly connected to the frame; wherein the unloading assembly is configured to move the bale off the bed and onto a ground surface to the rear of the frame.

9. The bale accumulator of claim 8 further comprising the unloading assembly comprising an apron extending around the bed between the front and the rear of the frame, and a guide extending between the first side and the second side of the frame and over the bed.

10. The bale accumulator of claim 1 further comprising a dovetail assembly connected to the frame; wherein the dovetail assembly is configured to lower at least a portion of the bed and angle downwardly to a ground surface.

11. The bale accumulator of claim 1 further comprising a linkage connected to the frame and extending through a slot in the trough and connected to a fence face of the fence ram; wherein the linkage is configured travel along a path of the slot.

12. The bale accumulator of claim 11 further comprising the linkage comprising a cylindrical member, an arm connecting member, and a face connecting member; wherein the cylindrical member is rotatably connected to the frame, and the arm connecting member and the face connecting member are fixedly connected to the cylindrical member.

13. The bale accumulator of claim 1 further comprising an unloading assembly and a dovetail assembly connected to the frame; wherein the unloading assembly and the dovetail assembly are selectively actuated by an operator via a controller.

14. The bale accumulator of claim 1 further comprising a push ram trip connected to the frame; wherein the push ram trip is configured to actuate by contact with the bale upon the bale reaching an unloading end of the intake conveyor; and wherein when the push ram trip is actuated, the push ram is actuated.

15. The bale accumulator of claim 1 further comprising a flip tray trip connected to the frame; wherein the flip tray trip is configured to actuate by contact with the bale upon the bale being received over the flip tray; and wherein when the flip tray trip is actuated, the flip tray is actuated and flips the bale onto the edge of the bale.

16. The bale accumulator of claim 1 further comprising a load indicator assembly connected to the frame; wherein the load indicator assembly is configured to actuate a load indicator when the bed is filled with a plurality of bales.

17. The bale accumulator of claim 1 further comprising a dovetail indicator assembly connected to the frame; wherein the dovetail indicator assembly is configured to actuate when a dovetail of an unloading assembly connected to the frame is in a lowered position.

18. The bale accumulator of claim 1 wherein the frame, the intake conveyor, the push ram, the trough ram, the trough, the fence ram, and the bed are configured to extend in substantially parallel spaced alignment with a ground surface during operation of the bale accumulator.

19. A bale accumulator comprising:
a frame having a front, a rear, a first side and a second side;
an intake conveyor extending outwardly from the front of the frame;
a push ram connected to the frame;
a trough ram connected to the frame;
a trough connected to the frame;
a fence ram connected to the frame;
a stabilizer frame connected to and above the frame; and
a trough gate rotatably connected to the stabilizer frame and positioned over the trough.

20. A bale accumulator comprising:
a frame having a front, a rear, a first side and a second side;
an intake conveyor extending outwardly from the front of the frame;
a push ram connected to the frame;
a trough ram connected to the frame;
a trough connected to the frame;
a fence ram connected to the frame;
a stabilizer frame connected to and above the frame; and
a stabilizer rotatably connected to the stabilizer frame;
wherein the stabilizer is configured to stabilize a bale during transport and to rotate when the bale is unloaded.

21. A bale accumulator comprising:
a frame having a front, a rear, a first side and a second side;
an intake conveyor extending outwardly from the front of the frame;
a push ram connected to the frame;
a trough ram connected to the frame;
a trough connected to the frame;
a fence ram connected to the frame;
an unloading assembly connected to the frame; and
the unloading assembly comprising an apron extending around a bed between the front and the rear of the frame, and a guide extending between the first side and the second side of the frame and over the bed;
wherein the unloading assembly is configured to move a bale off the bed and onto a ground surface to the rear of the frame.

22. A bale accumulator comprising:
a frame having a front, a rear, a first side and a second side;
an intake conveyor extending outwardly from the front of the frame;
a push ram connected to the frame;
a trough ram connected to the frame;
a trough connected to the frame;
a fence ram connected to the frame;

a linkage connected to the frame and extending through a slot in the trough and connected to a fence face of the fence ram; and the linkage comprising a cylindrical member, an arm connecting member, and a face connecting member;

wherein the cylindrical member is rotatably connected to the frame, and the arm connecting member and the face connecting member are fixedly connected to the cylindrical member;

wherein the linkage is configured to travel along a path of the slot.

23. A bale accumulator comprising:

a frame having a front, a rear, a first side and a second side;

an intake conveyor extending outwardly from the front of the frame;

a push ram connected to the frame;

a trough ram connected to the frame;

a trough connected to the frame;

a fence ram connected to the frame; and a push ram trip connected to the frame;

wherein the push ram trip is configured to actuate by contact with a bale upon the bale reaching an unloading end of the intake conveyor;

wherein when the push ram trip is actuated, the push ram is actuated.

* * * * *